March 5, 1968     J. L. PLATNER     3,372,060
FLUID DISTRIBUTION MEANS IN A FUEL CELL
Filed Dec. 26, 1962
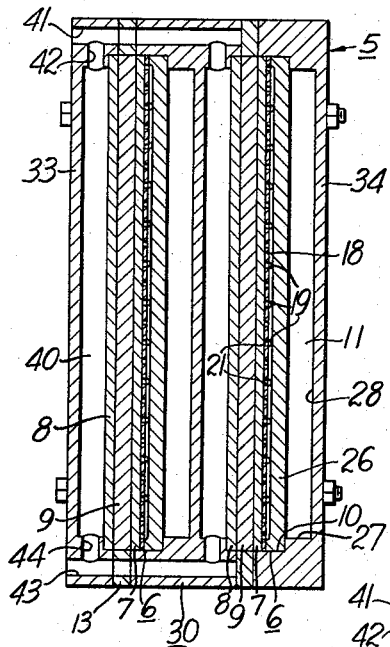
Fig. 2
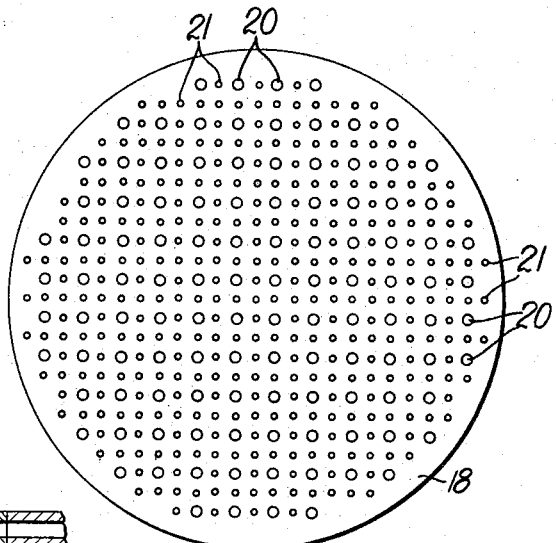
Fig. 4
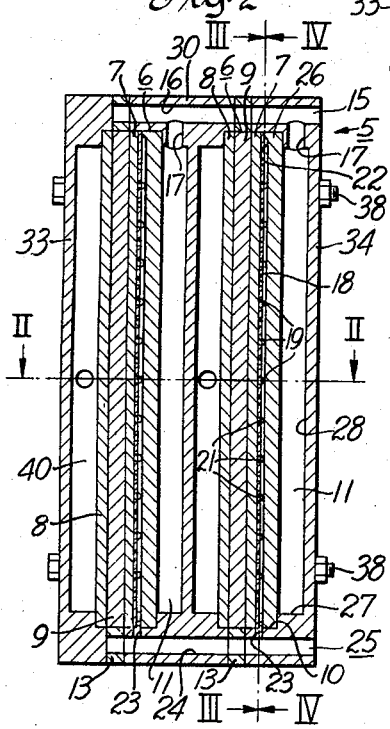
Fig. 5
Fig. 1
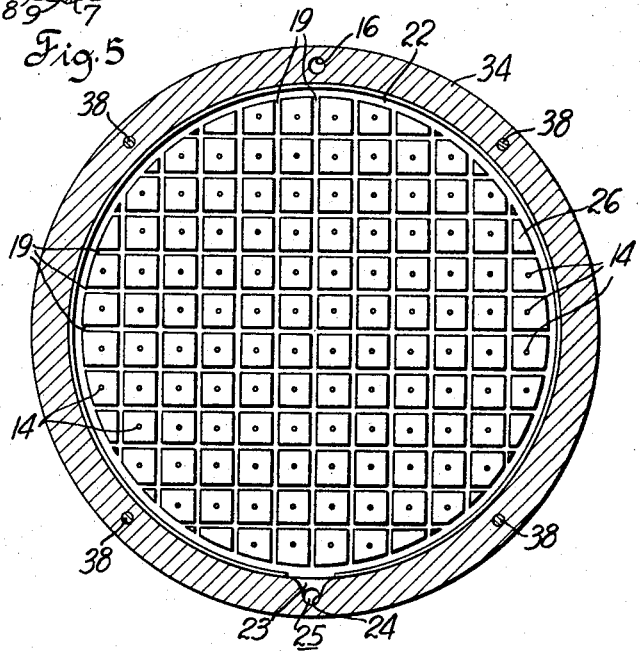
Fig. 3
Inventor
John L. Platner
By Joseph E. Kerwin
Attorney

United States Patent Office 3,372,060
Patented Mar. 5, 1968

3,372,060
FLUID DISTRIBUTION MEANS IN A FUEL CELL
John L. Platner, Milwaukee, Wis., assignor to Allis-Chalmers Manufacturing Company, Milwaukee, Wis.
Filed Dec. 26, 1962, Ser. No. 247,219
14 Claims. (Cl. 136—86)

This invention relates to fuel cells and fuel cell batteries, particularly to the means for supplying reactive fluids to the electrodes.

A fuel cell produces electrical energy directly from the chemical energy of combustible reactive fluids. Commonly these reactive fluids are known as a fuel fluid and an oxidizing fluid. A fuel cell may be constructed in different ways but one type essentially comprises an oxygen electrode, a fuel electrode, an electrolyte between the electrodes, and chambers adjacent the electrodes for placing the reactive fluid in contact with the electrodes. The chambers are located and the reactive fluids introduced into the fuel cell so that the fuel fluid passes over and into the fuel electrode and the oxidizing fluid passes over and into the oxygen electrode. The electrolyte is a liquid solution either contained within a chamber or impregnated in a permeable membrane. The electrodes are fluid permeable and the reactive fluids permeate their respective electrodes and therein contact the electrolyte which also permeates into the electrode. A chemical reaction takes place between the reactive fluids and the electrolyte (a catalyst may be present) to produce electrical current that can be used through an external circuit connected between the fuel and oxygen electrodes. In most practical applications, these fuel cells are integrally mounted and connected to form a fuel cell battery or module. The individual cells may be connected in series or parallel combinations to obtain the voltage and current desired.

In one type of fuel cell, for example, a hydrox fuel cell, hydrogen is used as fuel fluid, oxygen as oxidizing fluid, and the electrolyte is a liquid solution of potassium hydroxide. In this type of fuel cell, water is produced as an end product of the chemical reaction at the fuel electrode. This invention is applicable to this or a similar type cell wherein part of the end product produced at the fuel electrode permeates into the electrolyte and is consumed in a chemical reaction at the oxygen electrode, and part remains and accumulates in the fuel electrode. The amount that remains in the fuel electrode must be controlled by eliminating the excess water from the fuel cell for continuous effective operation. This is often accomplished, with varying but limited success, by carrying the surplus water out of the fuel cell with the excess hydrogen that passes into and out of the fuel cell without being consumed. Most of the water remaining in the fuel electrode vaporizes and tends to saturate the hydrogen but part may remain unvaporized and accumulates in the electrode. If the water vaporized becomes excessive, it will reduce the effectiveness of the cell because the hydrogen is diluted by the water vapor thereby reducing the amount of hydrogen per unit of volume of fluid actually contacting the electrode. Any accumulated unvaporized water reduces the effectiveness because it reduces the available reaction space in the electrode.

The problem of the presence of excess water vapor in the hydrogen is most pronounced in the usual fuel cell that has a chamber with a small inlet and outlet for conducting the fluid to and from the electrode. The flow paths created are irregular and develop dead spots with little replenishment of hydrogen, and swirling areas where the hydrogen makes many passes over the electrodes before it is exhausted. These dead spots and swirling areas lessen the amount of surface of the electrode actually contacted by new hydrogen, and there is little tendency to carry out water formed in the electrode because the hydrogen in these areas is already saturated.

Attempts have been made to overcome this problem with baffles and similar devices and the use of wider inlets and outlets. These have been only partially successful. The most successful attempt toward eliminating this problem utilizes a fuel cell with an electrode holder that has recesses or grooves functioning as a fluid distribution means for delivering the reactive fluid to and receiving it from the electrode. This distribution means in the usual embodiment is formed by two separate groups of grooves, distribution grooves and collection grooves, in the electrode holder. These grooves are formed contiguous to the electrode by the surface abutting the electrode. Reactive fluid is delivered along an inlet means under pressure to one group called the distribution grooves.

The reactive fluid flows through the electrode to the other group of grooves called the collection grooves. An outlet means receives the reactive fluid from the collection grooves and exhausts it from the fuel cell.

All the reactive fluids flowing into and out of the fuel cell must pass through the electrode. The stream of reactive fluid flowing through the electrode carries the water, or other end product, out of the electrode and the fuel cell.

Flowing the reactive fluid, particularly the fuel fluid, through the electrode has enabled some control of the amount of end product present, and has therefore increased the effectiveness of this type of fuel cell. Nevertheless, it has been found that even though the accumulation of end product in the fluid is substantially controllable, the fuel fluid picked up some end product as it passed along the groove. This accumulation of end product in the fuel fluid, as it flowed toward the far end of the collection groove, diluted the fuel fluid and soon the portions of the electrode in contact with the far end of the grooves (away from the inlet means) became saturated with end product. The net result was that those end portions of the electrode contained excessive amounts of end product that diluted the electrolyte beyond desirable limits, and equal control over the entire electrode was difficult, if not impossible. Also, any end product forced out of the far end of the electrode was replaced by the end product carried by the fuel fluid and as a result the electrode had portions flooded with end product thereby preventing occurrence of the reaction.

In the operation of this type of fuel cell, it is essential that the concentration of the electrolyte, such as potassium hydroxide, remain within certain limits. For example, as water is formed in the electrode, part of it mixes with the electrolyte and dilutes the concentration of electrolyte. It has been found that this concentration directly affects the output of the cell and must remain within certain limits if the fuel cell is to operate. That is, the fuel cell will cease operating if the concentration becomes too high (too much water has been removed) or if the concentration becomes too low (not enough water has been removed).

For efficient operation, it is necessary to control the amount of water removed from the cell and to accomplish this evenly across the entire electrode surface. With this invention, this is accomplished by introducing and distributing hydrogen (or other fuel fluid) at a controlled humidity evenly across the entire surface of the electrode and passing it through the electrode in discrete flow paths evenly distributed throughout the electrode. By selecting the relative humidity of the incoming hydrogen, the electrolyte concentration can be readily controlled throughout the electrode to maintain the entire electrode in an operating condition within the required limits of electrolyte concentration.

In accordance with this invention, a means is provided interposed between a means for delivering the reactive fluid and the electrode, for conducting the reactive fluid to the electrode at a plurality of evenly distributed places. To accomplish this, a distribution member is placed between the chamber or space that receives the reactive fluid and the electrode. This distribution member has holes, communicating between the chamber and the electrode, distributed evenly across the surface of the electrode. The side of the distribution member adjacent the electrode has grooves crisscrossing each other between, and not contacting, the distribution holes. These grooves originate and terminate in a circumferential peripheral groove that acts as a manifold. The fluid entering through the distribution holes flows through the electrode from the distribution holes to the collection grooves and then to the peripheral manifold groove. A preferred embodiment places a thin partition or foil between the distribution member and the electrode. This foil has a plurality of small collection holes located to communicate between the electrode and the grooves and another set of holes arranged to communicate between the distribution holes in the member and the electrode. The flow path is then from the chamber, through the distribution holes in the distribution member and the distribution holes in the foil, through the electrode to the collection holes in the foil, through the collection holes in the foil to the collection grooves, and along the collection grooves to the peripheral manifold groove from where it is exhausted from the fuel cell.

The primary advantage is that the reactive fluid does not pick up any end product in the chamber, since any reactive fluid that enters the electrode from the chamber does not return to the chamber. The reactive fluid flowing in the grooves could effect the humidity of the electrode in disproportionate and uncontrollable amounts but because the foil does not contact the electrode after it flows out of the collection holes to the grooves. Therefore, this exhausting reactive fluid does not create any significant control problem.

The objects of this invention are: to provide a new and improved fuel cell; to provide a new and improved means of supplying reactive fluid to the electrodes of a fuel cell; to provide a means for regulating the amount of reaction end product in the electrode; to maintain the electrolyte concentration within operable limits; to maintain continuous operation of a fuel cell by controlling the electrolyte concentration; to control the amount of end product present in the fuel fluid; to provide a fuel cell with an increased effective operating output; to provide fuel fluid to the fuel cell in a state relatively free from contamination by any end product already present in the electrode; to reduce the accumulation of the end product in the electrode; and to segregate the fuel fluid flow into three separated portions, entering the electrode within the electrode, and exhausting from the electrode.

Other objects and advantages will be apparent from the following description:

FIG. 1 is a cross sectional view of a fuel cell battery embodying this invention;

FIG. 2 is a cross sectional view of the same fuel cell battery taken along lines II—II of FIG. 1;

FIG. 3 is a view of the groove side of the fuel distribution member shown in FIGS. 1 and 2 taken along lines III—III of FIG. 1;

FIG. 4 is a view of the foil between the distribution member and electrode taken along lines IV—IV of FIG. 1; and FIG. 5 is a partial view, equivalent to that shown in FIG. 2, of another embodiment of this invention.

The type of fuel cell that would most advantageously adopt the type of construction that flows the reactive fluid through the electrode is generally of the type shown in the drawings. That is, a fuel cell that distributes fuel fluid against the surface of its electrodes with only a portion of the fuel fluid being consumed with the remainder passed out of the fuel cell and producing water as an end product. A commonly known example of this type of fuel cell is called a hydrox cell.

FIGS. 1 and 2 show a fuel cell battery 5 embodying this invention that has a number of fuel cell units 6 connected in series and held together by fastening bolts 38. These bolts serve to compress the fuel cell battery to maintain fluid tight compartments for containing the reactive fluids and electrolyte solution. Fluids introduced into the fuel cell are the reactive fluids, i.e., a fuel fluid and oxidizing liquid. These fluids may be any appropriate liquids and gases. A typical fuel fluid, hydrogen, and a typical oxidizing fluid, oxygen, will be used to describe the drawn embodiment of the invention.

Each fuel cell unit 6 as shown in FIGS. 1, 2, and 5, comprises a fuel electrode 7; an oxygen electrode 8; a fluid distribution member 26 having a plurality of distribution holes 14 (seen in FIG. 3); part of an electrode holder which may be either unipolar electrode holder 33 or 34 or bipolar electrode holder 30; and an electrolyte portion 9 containing an electrolyte solution impregnated in a permeable membrane. A gasket 13 insulates each electrode and electrode holder from the other and helps prevent the electrolyte portion from drying out. Means may be provided for replenishing the electrolyte solution if expedient or necessary. The electrodes are relatively thin platelike structures having a generally constant porosity that allows the reactive fluid and electrolyte to permeate into the electrode to contact each other. The term "oxygen electrode" is used to indicate the electrode receiving the oxidizing fluid and is not intended to be limited to the use of oxygen.

The structure of the fuel cell battery is formed to create a chamber for the reactive fluid. In the embodiments shown each bipolar electrode holder 30 and unipolar electrode holder 34 is adapted to seat fluid distribution member 26. The distribution member rests on a shoulder 10 and the cooperating structure forms a fuel fluid chamber 11 adjacent the electrode between the distribution member, an annular wall 27, and a surface 28 of the electrode holder. Distribution member 26 is therefore interposed between and separates fuel fluid chamber 11 and fuel electrode 7. The distribution member is adjacent the fuel electrode so that distribution holes 14 communicate between fuel chamber 11 and fuel electrode 7. A plurality of collection recesses or grooves 19 are formed on the side of distribution member 26 next to fuel electrode 7. A circumferential peripheral groove 22 connects all the collection grooves thereby acting as a manifold for the collection grooves.

In the embodiment shown in FIG. 5 the distribution member is contiguous to the fuel electrode and therefore, the collection grooves are formed contiguous the fuel electrode.

In the embodiment shown in FIGS. 1 and 2 a means, such as a thin separating partition or foil 18 (see FIG. 4), is interposed between the distribution member 26 and fuel electrode 7 to separate the distribution member from the electrode. Foil 18 has a plurality of perforations or holes 20 through which the reactive fluid is conducted, that coincide with distribution holes 14 and a plurality of collection perforations or holes 21 through which the fluid is conducted, that communicate between fuel electrode 7 and collection grooves 19. These collection holes are evenly distributed along the lengths of the grooves.

A means for delivering hydrogen to the electrode is provided and comprises a fuel fluid chamber 11 and a fuel fluid inlet means 15 for delivering hydrogen to chamber 11. The fuel fluid inlet means comprises a fuel fluid inlet pipe 16 and fuel fluid connecting pipes 17.

Hydrogen enters the fuel cell battery through inlet pipe 16, flows into each fuel fluid chamber 11 along each connecting pipe 17, and flows into fuel electrode 7 through distribution holes 14 in the distribution member and holes 20 in foil 18. After flowing through the electrode, hydrogen flows into a means for receiving hydrogen. This means receives the hydrogen in discrete sectional portions at a plurality of evenly distributed places on the electrode. This means for receiving may comprise collection holes 21, collection grooves 19 and a fuel fluid outlet means 25 for receiving the hydrogen from the collection grooves. From the electrode hydrogen flows through collection holes 21 in foil 18 into collection grooves 19. Fuel fluid outlet means comprises peripheral groove 22, outlet connecting pipes 23, and outlet pipe 24. A means (not shown), such as a pump, for flowing the hydrogen through the fuel cell battery provides hydrogen at inlet pipe 16 at a positive pressure relative to outlet pipe 24. Hydrogen present in fuel cell electrode 7 reacts with electrolyte from electrolyte portion 9 to produce water. More hydrogen is introduced that is consumed and the excess hydrogen carries some of the water out of the electrode as it flows into the collection grooves through collection holes 21. The hydrogen does not again contact the electrode but flows along the grooves to peripheral groove 22 from where it is exhausted alng the fuel fluid outlet means.

Referring particularly to FIG. 2, an oxidizing fluid chamber 40 is formed by unipolar electrode holder 33 and bipolar electrode holders 30. Chamber 40 is adjacent to oxygen electrode 8. A means for furnishing oxygen to the oxidizing chambers is provided and comprises oxidizing fluid inlet pipe 41 and oxidizing fluid connecting pipes 42. A means for exhausting any excess oxygen or inert substance present in the oxygen supply comprises oxidizing fluid outlet pipe 43 and oxidizing fluid connecting pipe 44.

On the oxidizing fluid side, the oxygen is supplied to the fuel cell battery from a source (not shown) and flows into oxidizing fluid chamber 40 from oxidizing fluid inlet pipe 41 through oxidizing inlet connecting pipe 42. The oxygen permeates from chamber 40 into oxygen electrode 8 to make chemical contact with the electrolyte. Any oxygen not consumed on any unusable materials present in the oxidizing fluid are exhausted.

In the embodiment shown, the fluid distribution members, electrode holders, and foils may be electrically conductive so that a series connection can be made across the cells through the unipolar distribution members 33 and 34 to deliver the current produced to an external circuit.

The fuel fluid flows through collection holes 21 and is received from collection grooves 19 by a fuel outlet means 11 and exhausted from the fuel cell. From each of distribution holes in the perforated foil, the hydrogen will generally flow through the electrode to the nearest collection holes communicating with the collection grooves so that there will be sectional flow paths through discrete portions of the electrode. These portions of the electrode, therefore, form part of the flow path of the fluid. As the hydrogen is forced to flow through the electrode from the distribution holes to the collection holes and grooves, chemical reactions occur in the electrode within the flow path. The water formed within the flow path is either carried out of and forced through the electrode by the excess flowing hydrogen or enters the electrolyte. Since water is consumed at the oxygen electrode some water must be allowed to remain in the cell to maintain the desired electrolyte concentration.

While the actual configuration and placement of the collection holes and grooves and distribution holes are not unduly critical, the collection holes and grooves are preferably arranged in the manner shown so that definable flow paths result that collectively pass through all parts of the electrode. The distribution holes are evenly distributed across the entire surface so that the hydrogen is distributed evenly over the electrode. The distance between a distribution hole and the nearest collection groove is preferably kept at a minimum so that the resistance to flow does not become too great. Also the ratio of hole area to total surface is preferably balanced so that water formed by the chemical reaction is adequately removed by the volume of flowing reactive fluid available.

FIG. 3 shows a preferable configuration of collection holes and grooves and distribution holes in the fluid distribution member. FIG. 4 shows the holes present in foil 18. The grooves are shown as two sets of parallel grooves with one set perpendicular to the other but this is only one of the possible configurations that would function efficiently. The size of the perforations and grooves is not critical and can be determined empirically for different fuel fluids. For hydrogen, holes of the order of about $\frac{1}{16}$ inch gooves about $\frac{1}{16}$ inch wide and $\frac{1}{16}$ inch deep have been found to be effective. With holes of this size the effectiveness of the fuel cell is continuously maintained at a high level, the fuel electrodes are prevented from being flooded with an accumulation of water, and the electrolyte concentration can be adequately controlled.

The embodiment shown in FIG. 5 operates in essentially the same manner except that foil 18 is removed so that collection grooves 19 communicate with the electrode along their entire length. The reactive fluid entering the electrode through distribution holes 14 flows through the electrode to collection grooves 19.

Although the foil is shown covering the entire area of the fluid distribution member, it is not essential that it cover any more than the collection grooves. The foil could be cut to fully expose all but the collection grooves to the electrode, or foil could be placed over the electrode portion next to the grooves. Also, the foil could be constructed as part of the fluid distribution member or as part of a single unit performing the function of the electrode holder, distribution member, and foil.

While the fluid distribution members and foil 18 are shown as being used only on the fuel fluid side, it is evident that it may be used on the oxidizing fluid side if the situation requires. This need could arise where the oxidizing fluid has a significant quantity of unusable substances present that would act in a manner similar to that of the end product at the fuel electrode or when humidity control is necessary at the oxygen electrode.

The drawings utilized to describe the invention are for the purposes of clearly and accurately describing an embodiment of the invention. In actual operation, many different forms of a similar type fuel cell may be utilized in applying this invention without departing from its spirit and scope.

The embodiments of the invention in which an exclusive property or privilege is claimed are defined as follows:

1. A fuel cell comprising a fluid permeable electrode; a fluid distribution member adjacent the electrode and having a surface abutting the electrode; a reactive fluid chamber adjacent the member for receiving fuel fluid; said member having a plurality of distribution holes communicating between the electrode and the chamber and a recess in the surface abutting the electrode located between the distribution holes; means for delivering reactive fluid only to the distribution holes; and outlet means for receiving reactive fluid only from the electrode via the recess.

2. A fuel cell comprising a fluid permeable electrode; a fluid distribution member adjacent the electrode and having a surface abutting the electrode; a reactive fluid chamber adjacent the member for receiving fuel fluid; said member having a plurality of distribution holes communicating between the electrode and the chamber and a plurality of collection grooves in the surface abutting the electrode located between the distribution holes; means for delivering reactive fluid only to the distribution holes; and outlet means for receiving reactive fluid only from the electrode via the collection grooves.

3. A fuel cell according to claim 2 having a separating partition between the electrode and the distribution member, said partition abutting the electrode and having a plurality of holes communicating between the distribution holes and the electrode, and a plurality of collection holes communicating between the electrode and the grooves.

4. A fuel cell according to claim 2 having a thin foil between the electrode and the distribution member, said foil having a plurality of holes communicating between the distribution holes and the electrode and a plurality of holes evenly distributed along the collection grooves communicating between the electrode and the collection grooves.

5. A fuel cell comprising a fluid permeable electrode; structure forming a fluid chamber adjacent the electrode; a fluid distribution member interposed between the fluid chamber and the electrode and having a surface abutting the electrode, said member having a plurality of evenly distributed distribution holes communicating between the fluid chamber and the electrode and a plurality of collection grooves in the surface abutting the electrode located between the distribution holes; means for delivering reactive fluid to the fluid chamber; and outlet means for receiving reactive fluid from the electrode via the collection grooves.

6. A fuel cell according to claim 5 having a perforated partition interposed between the electrode and the distribution member, said partition having a plurality of perforations communicating between the distribution holes and the electrode and a plurality of perforations communicating between the electrode and the collection grooves.

7. A fuel cell of the type producing water as a reaction product comprising a porous electrode; structure forming a fluid chamber adjacent the electrode; a fluid distribution member interposed between the chamber and the electrode, said member having a surface abutting the electrode, said surface having a plurality of collection grooves contiguous the electrode, and said member having a plurality of distribution holes located between said collection grooves communicating between the electrode and the fluid chamber; means for delivering reactive fluid to the distribution holes; and outlet means for receiving reactive fluid from the electrode via the collection grooves.

8. A fuel cell according to claim 7 having a partition interposed between the electrode and the surface of the distribution member, said partition having a plurality of holes communicating between the distribution holes and the electrode and a plurality of holes communicating between the electrode and the collection grooves.

9. In a fuel cell battery: platelike electrolyte portions; porous fuel electrodes; fluid permeable oxygen electrodes; electrically conductive bipolar electrode holders forming an oxidizing fluid chamber adjacent the oxygen electrode and a fuel fluid chamber adjacent the fuel electrode; a fluid distribution member interposed between the fuel fluid chamber and the electrode and having a surface abutting the electrode, said member having a plurality of distribution holes communicating between the fuel fluid chamber and the electrode and a plurality of collection grooves located between the distribution holes in the surface abutting the fuel electrode; means for delivering fuel fluid to the fuel fluid chamber; outlet means for receiving fuel fluid from the electrode via the collection grooves; and means for delivering oxidizing fluid to the oxidizing fluid chamber.

10. In a fuel cell battery: platelike electrolyte portions; porous fuel electrodes; porous oxygen electrodes; electrically conductive bipolar electrode holders forming an oxidizing fluid chamber adjacent the oxygen electrode and a fuel fluid chamber adjacent the fuel electrode; a fluid distribution member interposed between the fuel fluid chamber and the electrode and having a surface abutting the electrode, said member having a plurality of evenly distributed distribution holes communicating between the fuel fluid chamber and the electrode and a plurality of collection grooves in the surface abutting the fuel electrode located between the distribution holes, said collection grooves arranged to form two sets of spaced apart parallel grooves with one set perpendicular to the other set; a thin foil isolating the electrode from the distribution member, said foil having a plurality of holes communicating between the distribution holes and the electrode and a plurality of collection holes evenly distributed along the collection grooves communicating between the electrode and the collection grooves; means for delivering fuel fluid to the fuel fluid chamber; fuel fluid outlet means for receiving fuel fluid from the electrode via the collection grooves; and means for delivering oxidizing fluid to the oxidizing fluid chamber.

11. A fuel cell battery comprising juxtaposed fuel cell units, each of said units comprising an electrolyte portion centrally disposed between a porous fuel electrode and a porous oxygen electrode; a bipolar electrode holder disposed between the fuel cell fluid chamber adjacent a fuel electrode and an oxidizing fluid chamber adjacent an oxygen electrode, a fluid distribution member interposed between the fuel fluid chamber and the electrode, said fluid distribution member having a plurality of evenly distributed distribution holes communicating between the fuel chamber and the electrode and having a surface abutting the electrode, said surface having a plurality of crossing collection grooves located between said distribution holes and a circumferential peripheral groove communicating between the collection grooves; a fuel inlet conduit connecting the fuel fluid chambers of each electrode holder for receiving fuel fluid at a pressure greater than the pressure at the fuel outlet conduit; a fuel outlet conduit connecting the peripheral groove of each distribution member; means for furnishing oxidizing fluid to each of the oxidizing fluid chambers.

12. A fuel cell according to claim 11 having a thin foil abutting the electrode and located between the electrode and the distribution member, said foil having a plurality of holes communicating between the distribution holes and the electrode and a plurality of holes evenly distributed along the collection grooves communicating between the electrode and the collection grooves.

13. A fuel cell battery of the type producing water as a reaction end product comprising electrolyte portions; porous fuel electrodes each adjacent one side of each electrolyte portion; porous oxygen electrodes each adjacent the other side of each electrolyte portion; electrically conductive bipolar electrode holders each forming a fuel fluid chamber adjacent each fuel electrode and an oxidizing fluid chamber adjacent each oxygen electrode; a fluid distribution member abutting each respective electrode between each fuel fluid chamber and fuel electrode, said member having a plurality of evenly distributed distribution holes communicating between the fuel fluid chamber and the electrode and a plurality of evenly spaced collection grooves contiguous to the adjacent electrode, said collection grooves arranged to form two sets of parallel grooves with one set perpendicular to the other set; a fuel outlet means connecting the collection groove of each fuel distribution member; a fuel inlet means for connecting the fuel fluid chambers and for receiving fuel fluid at a positive pressure relative to the fuel outlet means; an oxidizing fluid inlet means for connecting the oxidizing fluid chambers and for receiving oxidizing fluid; and an oxidizing fluid outlet means for connecting the oxidizing fluid chambers.

14. A fuel cell according to claim 13 having a thin foil abutting the electrode between the electrode and the distribution member, said foil having a plurality of holes communicating between the distribution holes and the electrode and a plurality of holes evenly distributed along the collection grooves communicating between the electrode and the collection grooves.

References Cited

UNITED STATES PATENTS

| 2,980,749 | 4/1961 | Broers | 136—86 |
| 2,914,596 | 11/1959 | Gorin et al. | 136—86 |
| 2,969,315 | 1/1961 | Bacon | 136—86 |

FOREIGN PATENTS 871,950   7/1961   Great Britain.

ALLEN B. CURTIS, *Primary Examiner.*
WINSTON A. DOUGLAS, *Examiner.*
H. FEELEY, *Assistant Examiner.*

UNITED STATES PATENT OFFICE
CERTIFICATE OF CORRECTION

Patent No. 3,372,060                                March 5, 1968

John L. Platner

It is hereby certified that error appears in the above numbered patent requiring correction and that the said Letters Patent should read as corrected below.

Column 7, line 52, for "fluid permeable" read -- porous --; column 8, line 21, after "cell" insert -- units, said bipolar electrode holders each forming a fuel --.

Signed and sealed this 20th day of May 1969.

(SEAL)
Attest:

Edward M. Fletcher, Jr.
Attesting Officer

Commissioner of Patents